United States Patent [19] [11] 4,139,392
Davis et al. [45] Feb. 13, 1979

[54] CHROMOGENIC HOT MELT COATING COMPOSITIONS

[75] Inventors: Gerald T. Davis; Gerhart Schwab, both of Chillicothe, Ohio; Dale R. Shackle, Scottsboro, Ala.

[73] Assignee: The Mead Corporation, Dayton, Ohio

[21] Appl. No.: 828,535

[22] Filed: Aug. 29, 1977

Related U.S. Application Data

[60] Division of Ser. No. 747,682, Dec. 6, 1976, which is a continuation-in-part of Ser. No. 684,459, May 7, 1976, abandoned.

[51] Int. Cl.[2] .................... C09K 3/00
[52] U.S. Cl. .................... 106/14.5; 106/21; 106/24; 106/26; 106/31; 252/316
[58] Field of Search .................... 106/14.5, 21, 31, 24, 106/26; 282/27.5; 427/144, 150, 151, 152, 153; 428/307, 323, 411, 484, 486, 488, 537, 913, 914; 252/316

[56] References Cited

U.S. PATENT DOCUMENTS

| | | | |
|---|---|---|---|
| 3,016,308 | 1/1962 | Macaulay | 106/22 X |
| 3,079,351 | 2/1963 | Staneslow et al. | 428/914 X |
| 3,684,549 | 8/1972 | Shank | 428/476 |

*Primary Examiner*—George F. Lesmes
*Assistant Examiner*—Bruce H. Hess
*Attorney, Agent, or Firm*—Charles N. Shane, Jr.; Stephen H. Cagle; Wilson G. Palmer

[57] ABSTRACT

A pressure-sensitive carbonless transfer sheet comprising a paper substrate having a front and back surface and a coating composition adhered to at least one of the front and back surfaces of the paper substrate. The coating composition is set to a flexible, tack-free coat, and the coating composition includes a solvent free non-aqueous hot melt suspending medium which is characterized by being substantially water insoluble, being characterized by the presence of one or more functional groups selected from the group consisting of: carboxyl, carbonyl, hydroxyl, ester, amide, amine, heterocyclic groups and combinations thereof to impart polarity thereto and having a melting point of from about 60° C. to about 140° C. and a melting point range of less than about 15° C. In addition the coating composition includes an encapsulated, chromogenic material which is substantially dispersed therein, the hot melt suspending medium being compatible with the color forming characteristics of the capsular chromogenic material. This invention further includes a liquid chromogenic coating composition which comprises a hot melt suspending medium in combination with a microencapsulated chromogenic material. The chromogenic material is a color precursor of the electron donating type which is mixed with a carrier oil to form an oil solution of the chromogenic color precursor material which is then combined with one or more wall forming compounds.

8 Claims, No Drawings

CHROMOGENIC HOT MELT COATING COMPOSITIONS

CROSS REFERENCE TO RELATED APPLICATION

This application is a division of application U.S. Ser. No. 747,682, filed Dec. 6, 1976, which in turn is a continuation-in-part of commonly assigned, co-pending application U.S. Ser. No. 684,459 filed May 7, 1976, now abandoned.

BACKGROUND OF THE INVENTION

This invention relates to the production of pressure-sensitive carbonless transfer sheets for use in combination with a pressure-sensitive record sheet of the type whereby on application of pressure a color precursor is transferred to a record sheet which then develops a visible image. More particularly, it relates to the production of a pressure-sensitive carbonless copy sheet utilizing a hot melt system to form a coating dispersion containing a substantially uniformly dispersed chromogenic material, which coating is set by cooling. For purposes of this application the term "chromogenic" shall be understood to refer to chromogenic material such as color precursors, color formers and may additionally contain color inhibitors and the like. The term shall be understood to refer to such materials whether in microencapsulated, capsulated or other form. For purposes of this application the term CF shall be understood to refer to a coating normally used on a record sheet. In addition the term CB shall be understood to refer to a coating normally used on a transfer sheet and the term CFB shall be understood to refer to a transfer sheet having a CF coating on one side and a CB coating on the opposite side.

Carbonless paper, briefly stated, is a standard type of paper wherein during manufacture the backside of a paper substrate is coated with what is referred to as a CB coating, the CB coating containing one or more color precursors generally in capsular, and more specifically microcapsular, form. At the same time the front side of the paper substrate is coated during manufacture with what is referred to as a CF coating, which contains one or more color developers. Both the color precursor and the color developer remain dispersed in the coating compositions on the respective back and front surfaces of the paper in colorless form. This is true until the CB and CF coatings are brought into intimate relationship and sufficient pressure, as by a typewriter or stylus, is applied to rupture the CB coating to release the color precursor. At this time the color precursor contacts the CF coating and reacts with the color developer therein to form an image. Carbonless paper has proved to be an exceptionally valuable image transfer medium for a variety of reasons only one of which is the fact that until a CB coating is placed next to a CF coating both the CB and the CF are in an active state as the co-reactive elements are not in contact with one another. Patents relating to carbonless paper products are:

U.S. Pat. No. 2,550,466 (1951) to Green et al
U.S. Pat. No. 2,712,507 (1955) to Green
U.S. Pat. No. 2,730,456 (1956) to Green et al
U.S. Pat. No. 3,016,308 (1962) to Macauley
U.S. Pat. No. 3,170,809 (1965) to Barbour
U.S. Pat. No. 3,455,721 (1969) to Phillips et al
U.S. Pat. No. 3,466,184 (1969) to Bowler et al
U.S. Pat. No. 3,672,935 (1962) to Miller et al U.S. Pat. No. 3,955,025 (1976) to Matsukawa et al
U.S. Pat. No. 3,981,523 (1976) to Maalouf A third generation product which is in an advanced stage of development and commercialization at this time and which is available in some business sectors is referred to as self-contained paper. Very generally stated self-contained paper refers to an imaging system wherein only one side of the paper substrate needs to be coated and the one coating contains both the color precursor, generally in encapsulated form, and the color developer, generally as the continuous phase. Thus when pressure is applied, again as by a typewriter or other writing instrument, the color precursor capsule is ruptured and reacts with the surrounding color developer to form an image. Both the carbonless paper image transfer system and the self-contained system have been the subject of a great deal of patent activity. A typical autogeneous record material system, earlier sometimes referred to as "self-contained" because all elements for making a mark are in a single sheet, is disclosed in U.S. Pat. No. 2,730,456 (1956) to Green.

A disadvantage of coated paper products such as carbonless and self-contained stems from the necessity of applying a liquid coating composition containing the color forming ingredients during the manufacturing process. In the application of such coatings volatile organic solvents are sometimes used which then in turn requires evaporation of excess solvent to dry the coating thus producing volatile solvent vapors. An alternate method of coating involves the application of the color forming ingredients in an aqueous slurry, again requiring removal of excess water by drying. Both methods suffer from serious disadvantages. In particular the solvent coating method necessarily involves the production of generally volatile solvent vapors creating both a health and a fire hazard in the surrounding environment. In addition, when using an aqueous solvent system the water must be evaporated which involves the expenditure of significant amounts of energy. Further, the necessity of a drying step requires the use of complex and expensive apparatus to continuously dry a substrate which has been coated with an aqueous coating compound. A separate but related problem involves the disposal of polluted water resulting from preparation and cleanup of the aqueous coating composition.

The application of heat not only is expensive, making the total product manufacturing operation less cost effective, but also is potentially damaging to the color forming ingredients which are generally coated onto the paper substrate during manufacture. High degrees of temperature in the drying step require specific formulation of wall-forming compounds which permit the use of excess heat. The problems encountered in the actual coating step are generally attributable to the necessity for a heated drying step following the coating operation.

It is significant to note that previous attempts to produce coated paper and especially carbonless paper have almost uniformly required the use of an aqueous coating system. While various forms of non-aqueous coatings have been used successfully in coating of other materials it is significant to note that to date no commercially successful or practical non-aqueous coating system has been devised. See for example Macauley, U.S. Pat. No. 3,016,308 (1966) wherein a hot melt system is described. The system of Macauley has independently been shown not to be compatible with known microcapsules and thus not a commercial product. More particularly, a variety of known microcapsules when used in known hot melt systems have exhibited highly accelerated rates of capsule leakage and capsule degradation. Hence, there has been a long felt need for a non-aqueous coating material, which at the same time is solvent-free and which is compatible with a variety of known microcapsules. The solution of this problem has required the development of non-aqueous, solvent-free coating compositions, particularly hot melt coating compositions, which satisfy a broad range of performance criteria specific to carbonless paper and at the same time provide a compatible suspending medium for a dispersion of microcapsules. Repeated attempts to apply the teaching of non-carbonless paper arts, such as protective coatings and the like, have met with consistent failure.

Many of the particular advantages of the process and product of this invention are derived from the fact that a hot melt coating composition is used to coat the paper substrate. This is in contrast to the coatings used by the prior art which have generally required an aqueous or solvent coating as developed hereinabove. For purposes of this application the term "100% solids coatings" will sometimes be used to describe the coating composition and should be understood to refer to the fact that a hot melt coating composition is used and therefore the normal drying step normally present in the manufacture of paper and in coating has been eliminated.

In this regard, it should be noted that spot coating of aqueous systems, CB emulsion systems, has been known. See, for example, Macauley, U.S. Pat. No. 3,016,308 (1962) or Vassiliades, U.S. Pat. No. 3,914,511. Likewise, it is known to use hot melt CB coatings as disclosed in Macauley (3,016,308), Staneslow et al (3,079,351) and Shank (3,684,549). But to the best of our knowledge none of the hot melt coatings of the past are particularly effective or commercially practical.

Therefore, the need exists for an improved hot melt system for coating CB carbonless paper sheets so that spot coated sheets can be prepared. Additionally, the most preferred embodiment of this invention relates to a process for the continuous production of manifold carbonless forms and more particularly to a process for utilizing a hot melt system containing capsular chromogenic material. As can be appreciated from the above, the continuous production of a manifold paper product would require simultaneous coating, simultaneous drying, simultaneous printing, and simultaneous collating and finishing of a plurality of paper substrates. Thus, Busch in Canadian Pat. No. 945,443 indicates that in order to do so there should be a minimum wetting of the paper web by water during application of the CB emulsion coat. For that purpose a high solids content emulsion is used and special driers are described in Busch. However, because of the complexities of the drying step this process has not been commercially possible to date. More particularly, the drying step involving solvent evaporation and/or water evaporation and the input of heat does not permit the simultaneous or continuous manufacture of manifold forms. In addition to the drying step which prevents continuous manifold form production the necessity for the application of heat for solvent evaporation is a serious disadvantage since aqueous and other liquid coatings require that special grades of generally more expensive paper be employed and even these often result in buckling, distortion or warping of the paper since water and other liquids tend to strike through or penetrate the paper substrate. Additionally, aqueous coatings and some solvent coatings are generally not suitable for spot application or application to limited areas of one side of a sheet of paper. They are generally suitable only for application to the entire surface area of a sheet to produce a continous coating.

Another problem which has been commonly encountered in attempts to continuously maufacture manifold forms has been the fact that a paper manufacturer must design paper from a strength and durability standpoint to be adequate for use in a large variety of printing and finishing machines. This requires a paper manufacturer to evaluate the coating apparatus of the forms manufacturers he supplies in order that the paper can be designed to accommodate the apparatus and process designed exhibiting the most demanding conditions. Because of this, a higher long wood fiber to short wood fiber ratio must be used by the paper manufacturer than is necessary for most coating, printing or finishing machines in order to achieve a proper high level of strength in his finished paper product. This makes the final sheet product more expensive as the long fiber is generally more expensive than a short fiber. In essence, the separation of paper manufacturer from forms manufacturer, which is now common, requires that the paper manufacturer overdesign his final product for a variety of machines, instead of specifically designing the paper product for known machine conditions.

By combining the manufacturing, printing and finishing operations into a single on-line system a number of advantages are achieved. First, the paper can be made using ground wood and a lower long fiber to short fiber ratio as was developed supra. This is a cost and potentially a quality improvement in the final paper product. A second advantage which can be derived from a combination of manufacturing, printing and finishing is that waste or re-cycled paper hereinafter sometimes referred to as "broke" can be used in the manufacture of the paper since the quality of the paper is not of an overdesigned high standard. Third and most importantly, several steps in the normal process of the manufacture of forms can be completely eliminated. Specifically drying steps can be eliminated by using a non-aqueous, solvent-free coating system and in addition the warehousing and shipping steps can be avoided thus resulting in a more cost efficient product.

Additionally, by using appropriate coating methods, namely hot melt coating compositions and methods, and by combining the necessary manufacturing and printing steps, spot printing and spot coating can be realized. Both of these represent a significant cost savings but nevertheless one which is not generally available when aqueous or solvent coatings are used or where the manufacture, printing and finishing of paper are performed as separate functions. An additional advantage of the use of hot melt coating compositions and the combination of paper manufacturer, printer and finisher is that when the option of printing followed by coating is available significant cost advantages occur. More particularly, by printing prior to coating from about 10% to about 30% fewer capsulated chromogenic ingredients need to be used to achieve the same satisfactory levels of image transferability. This advantage is realized because when the paper is transferred to a forms manufacturer in coated form the paper of necessity will lose some of its encapsulated chromogenic materials when printed because of the pressure rupturability of the material. This disadvantage is eliminated when the paper is printed first followed by coating.

Other patents considered relevant to the state of the prior art include:

U.S. Pat. No. 2,170,140 (1939) to Grupe
U.S. Pat. No. 2,781,278 (1957) to Harmon
U.S. Pat. No. 3,031,327 (1962) to Newman

SUMMARY OF THE INVENTION

A pressure-sensitive carbonless transfer sheet comprising a paper substrate having a front and back surface and a coating composition adhered to at least one of the front and back surfaces of the paper substrate. The coating composition is set to a flexible, tack-free coat, and the coating composition inclues a solvent free non-aqueous hot melt suspending medium which is characterized by being substantially water insoluble, being characterized by the presence of one or more functional groups selected from the group consisting of: carboxyl, carbonyl, hydroxyl, ester, amide, amine, heterocyclic groups and combinations thereof to impart polarity thereto and having a melting point of from about 60° C. to about 140° C. and a melting point range of less than about 15° C. In addition, the coating composition includes an encapsulated, chromogenic material which is substantially dispersed therein, the hot melt suspending medium being compatible with the color forming characteristics of the capsular chromogenic material. This invention further includes a liquid chromogenic coating composition which comprises a hot melt suspending medium in combination with a microencapsulated chromogenic material. The chromogenic material is a color precursor of the electron donating type which is mixed with a carrier oil to form an oil solution of the chromogenic color precursor material which is then combined with one or more wall forming compounds. A novel process is provided for producing a pressure-sensitive carbonless transfer sheet which comprises the steps of preparing a hot melt suspending medium, the hot melt suspending medium being water insoluble and having a melting point of from about 60° C. to about 140° C. and a melting point range of from about 0° C. to about 15° C. A microencapsulated chromogenic material is prepared and dispersed in the hot melt suspending medium, the chromogenic material being a color precursor of the electron donating type. A coating dispersion is prepared by combining the hot melt suspending medium with the microencapsulated chromogenic color precursor material, the hot melt suspending medium being compatible with the color forming or developing characteristics of the chromogenic material. The coating dispersion is then applied to a substrate, the coating dispersion being applied at a coat weight of from about 1.0 pounds to about 8.0 pounds per 3300 square feet of substrate at a coat thickness of from about 1 micron to about 50 microns. The coated substrate is set by cooling the coating dispersion.

DETAILED DESCRIPTION OF THE INVENTION the chromogenic coating composition of this invention is essentially a dispersion of an encapsulated chromogenic material in a hot melt system. The encapsulated chromogenic material can be either soluble or insoluble in the hot melt system and the color precursors are in dispersed microcapsulated form.

Filler materials can also be added to modify the properties of the final coated substrate. The use of solvents, which require heat to remove them during the setting of the coated film, is avoided. However, minor amounts of solvents can be tolerated without requiring a separate step for drying during any subsequent setting step. Although the product and process of this invention are useful in the manufacture of a variety of products the preferred use of the process and product of this invention is in the production of carbonless paper and more particularly in the continuous production of a manifold carbonless form.

The chromogenic color precursors most useful in the practice of the preferred embodiment of this invention are the color precursors of the electron-donating type. The preferred group of electron donating color precursors include the lactone phthalides, such as crystal violet lactone, and 3,3-bis-(1'-ethyl-2-methylindol-3''-yl) phthalide, the lactone fluorans, such as 2-dibenzylamino-6-diethylaminofluoran and 6-diethylamino-1,3-dimethylfluorans, the lactone xanthenes, the leucoauramines, the 2-(omega substituted vinylene)-3,3-disubstituted-3-H-indoles and 1,3,3-trialkylindolinospirans. Mixtures of these color precursors can be used if desired. In the preferred process of this invention microencapsulated oil solutions of color precursors are used. The color precursors are preferably present in such oil solutions in an amount of from about 0.5% to about 20.0% based on the weight of the oil solution, and the most preferred range is from about 2% to about 7%.

The hot melt suspending media generally useful in the practice of this invention include waxes and resins. The preferred group of compounds useful as hot melt suspending media include: deresinated, oxidized mineral waxes such as the montan waxes, amide waxes such as bis-stearamide wax, stearamide wax, behenamide wax, fatty acid waxes, hydroxylated fatty acid waxes, hydroxy stearate waxes, oxazoline waxes, amine waxes and mixtures thereof. The hot melt suspending medium is characterized by having a penetration hardness of less than or equal to from about 0.1 to about 20.0, a melting point of from about 60° C. to about 140° C., a narrow melting range of less than about 15° C., a low viscosity when molten, a certain amount of polarity and a light color.

Included in the preferred group of hot melt suspending media are the following waxes: 2-n-heptadecyl-4,4-bis-hydroxymethyl-2-oxazoline,N,N'-ethylenebisstearamide, N-(2-hydroxyethyl)-12-hydroxystearamide, glyceryl monohydroxystearate and ethylene glycol monohydroxystearate and mixtures thereof.

Other waxes of this type which have generally proved to be effective are generically described as the modified mineral type, synthetic waxes or those of vegetable origin or combinations thereof. Waxes of vegetable origin which have been shown to be especially effective in the process and products of this invention include carnauba wax and castor wax. These waxes must be characterized by a high melting point and a substantial hardness which eliminates wax transfer to the developing sheet, thus improving image clarity, increasing blocking temperature and diminishing packing problems. One of the most preferred waxes for use in the process and product of this invention are the deresinated crude montan waxes. These waxes are produced from a raw material of bitumen-rich liqnite which is extracted with organic solvents to form a crude montan wax. The montan wax is deresinated by extraction with organic solvents followed by oxidation with chromic acid to yield acid waxes.

Another type of preferred hot melt suspending media is a non-polar hydrocarbon wax, such as Be Square 170/175 from Bareco Division of Petrolite Corporation which includes a small amount of dispersing agent. The dispersing agent may, for instance, be sulfated castor oil, more commonly known as Turkey Red Oil.

The preferred waxes of this invention have a penetration hardness of from about 0.1 to about 20 measured by the needle penetration test given a ASTM designation of D1321-61T. The range of 0.1 to 20.0 represents a practical penetration hardness range. A more preferred range is from about 0.1 to about 3 and the most preferred range is from about 0.1 to about 1 on the same needle penetration index. The needle penetration index covers a test procedure for the empirical estimation of the consistency of waxes derived from petroleum by measurement of the extent of penetration of a standard needle. This method is applicable to waxes having the penetration of not greater than 250. The penetration of petroleum wax is the depth, in tenths of a millimeter, to which a standard needle penetrates into the particular wax under defined conditions. The defined conditions generally are that the sample is melted, heated to 30° F. above its melting point, poured into a container, and then air cooled under controlled conditions. The sample is then conditioned at test temperature in a water bath. Penetration is measured with a penetrometer, which applies a standard needle to the sample for 5 seconds under a load of 100 grams.

A second characteristic of the desired hot melt suspending media of this invention is a melting point of from about 60° C. to about 140° C. A more preferred melting point for the waxes or resins of this invention is from about 70° C. to about 100° C. Also relative to the melting point, it is necessary for the coating composition of this invention to set rapidly after application to the particular substrate. More particularly, a practical melting range limitation, or in other words range of temperature in which the liquid hot melt composition sets into a solid composition, is from about 1.0° C. to about 15° C. The preferred setting time is from about 0.5 seconds to about 5 seconds while the most preferred setting time is from about 0.5 seconds to about 2 seconds. While melting ranges of more than 15° C. can be used the time necessary for such a coating composition to set requires special apparatus and handling and makes use of these hot melt compounds commercially unattractive.

As has been developed supra when developing a hot melt activation system it is necessary to evaluate a large number of waxes, resins and combinations of waxes and resins. In light of the large number of available waxes and resins it is necessary to develop criteria which indicate the likelihood of satisfactory performance in a carbonless paper environment. As has been developed supra hardness as measured by a needle penetration test, melting range and melting point in addition to setting time are all necessary characteristics which must be specifically controlled within defined ranges in order to provide a satisfactory carbonless paper product. Another very important feature of any hot melt activation system is the thermogravimetric characteristic of the components of the system. Specifically, thermogravimetric analysis techniques measure the weight loss of a specific sample material as a function of temperature and elapsed time. The weight loss experienced in hot melt activation systems is of great value in predicting hot melt activation system behavior under actual production and storage conditions. As may be surmised it is desirable that each component of a hot melt activation system, i.e. the hot melt itself and the microcapsules system, show as little weight loss as possible over a given period of time. In evaluating the hot melt activation systems of this invention for thermogravimetric characteristics the following technique was used. A large variety of sample hot melt systems were tested. Among those samples tested were hot melt activation systems, waxes alone, and microcapsules alone. The test procedure was to weight out a sample of 20 milligrams of the particular hot melt substance to be tested. The 20 milligram sample was placed in a receptacle in thermogravimetric analysis equipment which is commercially available from a variety of sources. At this time the 20 milligram sample was exposed to varying thermal conditions which were specifically controlled. The test is run for a predetermined length of time generally from about one hour to about ten hours. During this test a graph is produced showing the weight loss as a function of the elapsed time at a given temperature. After a variety of testing it has been determined that the hot melt activation systems which are suitable for use in the process of this invention should have a weight loss range of from about 0 mg/g/hr at 90° C. to about 15 mg/g/hr at 90° C. A more preferred range is from about 0 mg/g/hr at 90° C. to about 10 mg/g/hr. at 90° C. and the most preferred range is from about 0 to about 5 mg/g/hr at 90° C.

An additional test which is used to evaulate hot melt activation systems for use in carbonless paper systems is referred to as a heat stability test. In the heat stability test a plurality, preferably 12, of carbonless paper sheets having a CF coating on one side and a CB coating on the other side (commonly referred to as CFS sheets) are stacked so that the CF and CB surfaces of adjacent sheets are in intimate and abutting contact with each other throughout the stack. The stack of carbonless paper is placed between two glass plates of equal or larger size than the individual sheets, and a 1,000 gram metal weight, a brass cylinder of the dimensions "53 millimeters height, 50 millimeters diameter", is placed in the center of the upper glass plate. This assembly is placed in an oven at 60° C. for a period of time of from about one day to about seven days as desired. Samples are then extracted from the stack of carbonless paper sheets and the following combinations of surfaces are typed against each other:

1. CF side of aged CFB against a control CB;
2. CB side of aged CFB against a control CF;
3. CB side of aged CFB against CF side of aged CFB.

These sheet couples are imaged with an electric typewriter using the characters "m" in a repeating block pattern, and the intensity of the images is measured as the ratio of the reflectance of the imaged area to the reflectance of the unimaged background after an elapsed time of ten minutes. Typewriter intensity may be expressed mathematically as $$T.\ I. = (100)\ Ri/Ro$$

Where Ri is reflectance of the imaged area and Ro is reflectance of the background (unimaged) area as measured with a Bausch and Lomb opacimeter. Comparison is made of the ten minute typewriter intensities of the set of sheet couples with the typewriter intensities of the similar set using the CFB sheets before aging. The difference in the typewriter intensity before and after aging is the measure of the heat stability (heat resistance) of the carbonless paper systems. It is important to note here that the loss of intensity may be from a variety of factors such as the wax material actually penetrating the paper and migrating to the CF coating thus desensitizing the CF coating. This test is a critical test for the performance evaluation of a carbonless paper product. Specifically, if a wax loss occurs the remaining wax may become harder and more brittle thus affecting the overall sheet characteristics of the carbonless paper. In the same fashion the color of the sheet can darken thus providing an unacceptable commercial carbonless paper product and/or the pH and other rheological properties of the coating composition may change all of which act to the detriment of the overall carbonless paper product. As a result of this it is absolutely critical that the heat stability characteristics of the hot melt coating composition of this invention be controlled within set limitations. It has been found that some waxes which satisfy many of the criteria set forth heretofore for the hot melt or hot melt activation system of this invention will penetrate the paper after a period of time and actually penetrate through to the opposite side from which it was applied. While this is a negative effect from the standpoint of the hot melt coating composition being detrimentally affected it also can affect the oppsite side of the sheet of paper. Specifically, the migration of wax through the paper generally results in the substantial desensitization of the opposite CF side of the sheet. This is one of the primary causes in the loss of typewriter intensity in CF coatings. On top sheets or related sheets wherein there is no CF coating a waxy gloss or surface characteristic is found in sheets where a migrating wax is used. As a result of substantial experimentation by the inventors herein it has been found that a typewriter intensity loss rating of from about 0 to about 15 units over a seven day period is an acceptable range. A more preferred range is from about 5 to about 10 units loss over a seven day period while a most preferred range is from about 0 to about 5 units loss over a seven day period. All of these typewriter intensity loss figures are based on a preliminary typewriter intensity of less than 75 typewriter intensity units. Preferred and most preferred ranges vary slightly with regard to whether a CF, CB or CFB sheet is being evaluated but are not considered significant and the range of from about 0 to about 15 typewriter intensity units loss per seven day period is considered adequate for commercial purposes. It is important to note that in both the heat stability test as measured by typewriter intensity and in the thermogravimetric analysis test as measured by weight loss the overall hot melt activation system including microcapsules can be adequately evaluated. Along these same lines it is important to note that a variety of waxes and/or microcapsules are known in the prior art for purposes of coating but many if not most of these prior art waxes and microcapsules are not suitable for use herein. It is especially significant to note that to the best of applicant's knowledge no other hot melt activation system incorporating these characteristics of heat stability and thermogravimetric weight loss are known.

The hot melt waxes and resins of this invention must also have a low viscosity when in a molten state in order to facilitate ease of spreading on the substrate. In general, it is desirable that the hot melt suspending media have a viscosity of less than about 120 centiposes at a temperature of approximately 5° C. above the melting point of a particular hot melt suspending medium. In addition, it is preferred that the hot melt wax or hot melt suspending media of this invention have a light color in order to be compatible with the final paper or plastic product being produced. This means that it is preferred for the hot melt to be white or transparent after application to the particular substrate being coated.

The preferred waxes, resins and other hot melt suspending media of this invention preferable are polar. By polar it is meant that a certain amount of polarity is characteristic of the preferred waxes, the polar compositions being characterized by the presence of functional groups selected from the group consisting of: carboxyl, carbonyl, hydroxyl, ester, amide, amine, heterocyclic groups and combinations thereof. An alternate but less preferred embodiment of this invention includes the use of non polar hydrocarbon waxes which must be used in conjunction with a dispersing agent.

The additives which may be included in the hot melt CB coating composition are typically an opacifying agent such as titanium dioxide or clay, a stilting agent such as Arrowroot starch and wax modifying agents such as resin materials soluble or dispersible in the main wax and which in some instances improves wax quality.

The method of dispersing the microcapsules in the hot melt suspending media is also important since it is, likewise, necessary to use a process which prevents significant agglomeration of the microcapsules. In the preferred process the microcapsules are formed into an aqueous slurry containing approximately 40% solids and are then spray dried to form a free-flowing powder. The free-flowing microcapsules are stirred into a molten phase of a suspension medium, such as a wax, a mixture of waxes, a resin or mixture thereof to form a smooth disperson of microcapsules in the continuous molten phase. This hot melt can then be coated or printed, by gravure, blade coating, flexography or other means onto the continuous web. The hot melt system sets substantially immediately after application to the web and forms an excellent marking sheet. Dispersibility has a key component of any hot melt activation system. The dispersibility characteristics of the hot melt activation system disclosed herein, in which microcapsules are incorporated into a hot melt mixture, are not only important but are absolutely essential to the effective practice of this invention. More particularly, it has been extremely difficult in previous attempts to make carbonless paper to form an adequate dispersion of microcapsules in any hot melt suspending medium.

As was stated previously, carbon paper and related coated paper-based products which incorporate pigments, dyes and the like into a hot melt and coat that hot melt on paper do not appreciate or realize the significance of dispersibility problems. More particularly, in most situations the components of a carbon paper system can be adequately dispersed by extreme heat or extreme agitation without any damage to the final carbon paper product. Such is not the case in the hot melt activation system of this invention where extreme heat or extreme agitation have the potential to cause microcapsular leakage and/or damage and do not significantly affect the dispersion characteristics of microcapsules.

The dispersibility of any particular microcapsule system in any particular hot melt activation system is a function of the chemical interaction of the two systems. It has been shown that a subjective, yet reproduceable, numerical rating in dispersion units can be assigned to any microcapsular/hot melt system to evaluate its commercial potential. Applicant has devised several dispersion characteristics such as agglomeration, microcapsules per unit area and flowability of various microcapsular-hot melt activation systems. In evaluating these systems a numerical figure of from 0 to 10 is assigned to each system which represents dispersion units. The number 0 would represent a non-dispersed system wherein essentially a large agglomerated mass of microcapsules exist. At the other end of the subjective spectrum of dispersibility is a uniform dispersion of individual microcapsules in a hot melt continuous medium. While lower dispersion characteristics are acceptable for many products a high degree of dispersibility is essential for the effective production of carbonless paper.

It has been experimentally determined that a dispersion characteristic rating of from about 6 to about 10 is commercially acceptable and is described herein as "substantially dispersed", while a rating of from about 8 to about 10 is preferred. A most preferred dispersion rating for use in carbonless paper systems would be from 9 to about 10 . A dispersion which would be given a rating of 4 on the disperson characteristic test of applicants may be satisfactory for products other than carbonless paper. However poor dispersion characteristics in carbonless paper result in an unsatisfactory product which do not image properly and which suffer from feathering and from incomplete and irregular line and image formation. Thus, dispersibility is considered a key characteristic of any hot melt activation system including microcapsules. Dispersibility can be attained by several methods although use of extreme process conditions such as agitation or heat are generally not considered feasible in carbonless paper manufacture. The dispersion characteristics most preferred for carbonless paper are attained by using a hot melt activation system and microcapsular system which are chemically compatible to promote dispersibility.

In the preferred embodiment of this invention a dispersing agent is added to the microcapsules prior to combining the microcapsules with the hot melt suspending medium. A preferred group of dispersing agents are the anionic dispersing agents, many of which are commercially available. A preferred group of anionic dispersing agents includes the sodium salts of condensed naphthalene sulfonic acid, the sodium salt of polymeric carboxylic acid, the free acids of complex organic phosphate esters, sulfated castor oil, poly(methylvinyl) ether/maleic and hydride) and combinations thereof. The most preferred dispersing agent is sulfated castor oil. The dispersing agent is added to the microcapsules in an amount of from about 0.1% to about 10% based on the dry weight of the microcapsules. A preferred range of addition is from about 0.5% to about 5.0% based on the dry weight of the microcapsules while a most preferred range is from about 1.0% to about 3.0% based on the dry weight of the microcapsules In some instances the dispersing agent and the wall forming material are one in the same and the wall forming material not actually used in the microcapsule wall formation is present in hot melt coating dispersions as a dispersing agent. Although, as described above, many of the well-known, commercially available dispersing agents can be used in the process and product of this invention a group of secondary dispersing agents that may be present as excess wall forming material includes: hydroxypropylcellulose, gum arabic, gelatin, polyvinyl alcohol, carboxymethylcellulose, and mixtures of the above.

While the dispersing agent can be added at any point in the process of this invention prior to the setting of the coating composition, to achieve the most desirable results the dispersing agent should be added to the microcapsules prior to combining the microcapsules with the hot melt suspending medium. The particular amount of dispersing agent used is dependent on several variables including the particular type of microcapsule used, the particular type of hot melt suspending medium, the concentration of the aqueous microcapsular slurry, the viscosity of the hot melt suspending medium and the desired final coated product. For purposes of this application a practical range of addition based on the weight of the microcapsules is from about 0.1 part by weight to about 10.0 parts by weight. A preferred range of addition would be from about 0.5 to about 5.0 parts by weight while the most preferred range of addition would be from about 1.0 to about 3.0 parts by weight.

The chromogenic coating composition can be applied to a substrate, such as paper or a plastic film by any of the common paper coating processes as developed above such as roll, blade coating or by any of the common printing processes, such as gravure, or flexographic printing. The rheological properties, particularly the viscosity of the coating composition, can be adjusted for each type of application by proper selection of the type and relative amounts of hot melt suspending media. While the actual amount of the hot melt coating dispersion applied to the substrate can vary depending on the particular final product desired, for purposes of coating paper substrates CB coat weight of from about 1 pound to about 8 pounds per 3300 square feet of substrate have been found practical. The preferred range of CB coat weight application is from about 2.5 pounds to about 5.0 pounds per 3300 square feet of substrate, while the most preferred range is from about 3 pounds to about 4 pounds per 3300 square feet of substrate. If the CF chromogenic materials and a color developer (CF) are combined into a single or self-contained chromogenic coating composition practical coat weights include from about 2.0 pounds to about 9.0 pounds per 3300 square feet of substrate, the preferred coat weight is from about 3.0 pounds to about 6.0 pounds per 3300 square feet, and the most preferred range is from about 4.0 pounds to about 5.0 pounds per 3300 square feet of substrate.

These hot melt coating dispersions or hot melt coating compositions, the terms being used interchangeably, can be set by any cooling means. Preferably a chill roll is used on the coating apparatus which cools the hot melt coating immediately after coating, but is also quite common to simply allow the coating composition to cool naturally by atmospheric exposure. As the temperature of the coating composition is substantially higher than room temperature and in light of the fact that the coating thickness is generally from about 1 micron to about 50 microns it can be seen that when spread out over a substrate the hot melt material cools very rapidly. The actual exposure or chill time necessary for setting of the chromogenic coating composition is dependent on a number of variables, such as coat weight, the particular hot melt suspending medium used, type of cooling means, temperature of cooling means and others.

The choice of wall-forming material and hot melt suspending media is important since certain microcapsules having walls of hydroxyethylcellulose when made by certain patented processes and certain polyamides tend to agglomerate even in polar waxes. Agglomeration is undesirable since this prevents uniform distribution of the chromogenic material on the CF sheet. This may adversely affect transfer and uniformity of the intensity of the formed image.

The particular method of encapsulation or the particular encapsulated chromogenic material are not asserted to be an inventive feature herein. Rather, there are described in the patent literature various capsular chromogenic materials which may be used. Such chromogens have been encapsulated in gelatin wall-forming materials (see U.S. Pat. Nos. 2,730,456 and 2,800,457) including gum arabic, in polyvinyl alcohol, in carboxymethylcellulose, in resorcinol-formaldehyde wall-formers (see U.S. Pat. No. 3,755,190), isocyanate wall-formers (see U.S. Pat. No. 3,914,511) and hydroxypropylcellulose (see commonly assigned co-pending application Ser. No. 480,956, filed June 19, 1975 now abandoned) in addition to mixtures of the above. Microencapsulation has been accomplished by a variety of known techniques including coacervation, interfacial polymerization, polymerization of one or more monomers in an oil, various melting, dispersing and cooling methods. Compounds which have been found preferable for use as wall forming compounds in the various microencapsulation techniques included: hydroxypropylcellulose, methylcellulose, carboxymethylcellulose, gelatin, melamineformaldehyde, polyfunctional isocyanates and prepolymers thereof, polyfunctional acid chlorides, polyamines, polyols, epoxides and mixtures thereof.

Particularly well-suited to use in the present invention are microcapsules of a hydroxypropylcellulose (HPC) material. This is because such microcapsules are easily dispersed in most hot melt media. If necessary, a small amount of dispersing agent as described above can also be added to improve the dispersion. In addition, the HPC capsules have good permeability, strength, and temperature characteristics.

In the preferred application of the process and products of this invention a manifold carbonless form is produced. In this process a continuous web is marked with a pattern on at least one surface. A non-aqueous solvent-free hot melt coating of chromogenic material is applied to at least a portion of at least one surface of the continuous web. The coated surface is then set by cooling. The continuous web having the set coating is then combined with at least one additional continuous web which has been previously or simultaneously coated with a hot melt material and set by cooling. A manifold carbonless form is then made by a variety of collating and finishing steps. Such a process and product are described in commonly-assigned, co-pending application entitled "Manifold Carbonless Form and process for the Continuous Production Thereof (Custom),38 U.S. Ser. No. 684,461, filed May 7, 1976, now U.S. Pat. No. 4,112,138 which is incorporated herein by reference.

In the most preferred application of the process and products of this invention a manifold form is continuously produced. In this most preferred embodiment a plurality of continuous webs are advanced at substantially the same speed, the plurality of continuous webs being spaced apart and being advanced in cooperating relationship with one another. At least one web of the plurality of continuous webs is marked with a pattern and at least one non-aqueous, solvent-free hot melt coating containing the capsular chromogenic material is applied to at leat a portion of at least one of the plurality of continuous webs. The hot melt material is then set by cooling. The continuous webs are then collated and placed in contiguous relationship to one another to create a manifold form. After the continuous webs are placed in collated, contiguous relationship they can be finished by any combination of the steps of combining, partitioning, stacking, packaging and the like. Such a process and product are described in commonly-assigned, co-pending application entitled "Manifold Carbonless Form and Process for the Continuous Production Thereof (Standard)," U.S. Ser. No. 684,460, filed May 7, 1976, now U.S. Pat. No. 4,097,619, which is incorporated herein by reference.

EXAMPLE I

Apparatus

The apparatus used is a four-necked round bottom flask fitted with stirrer, vacuum take-off, additional funnel and manometer.

Run A

The above mentioned four-necked flask containing 60 gm. oxazoline wax (Oxawax TS-254AA) was immersed into an oil bath at a bath temperature of 210 to 220° F. The wax melted and an aspirator was connected to produce reduced pressure (26 mm Hg). An aqueous HPC capsule slurry (60.5 gm., dry weight) was added over a period of several hours during which time the water was removed.

The final hot melt dispersion was of low viscosity, about 400 cps at 85° C. and easy to apply to paper with a heated Mayer bar. The coated sheet appeared smooth and white with a slightly waxy feel. It marked very well when typed against a novolak coated record sheet.

Run B

In the same apparatus a mixture of 56 gm. Oxawax TS-25 AA and 14 gm. Oxawax TS-254A was melted. 30 gm. HPC capsules (dry weight) were slowly added to the melt under reduced pressure and agitation. To the final hot melt 20 gm. of dry arrowroot starch was added. The mixture had a viscosity of 600 cps at 85° C. It was coated on paper to form a white slightly waxy surface. This CB surface formed clear and intense images when typed against a novolak coated record sheet.

The oxazoline waxes used above contain the heterocylic oxazoline group and some hydroxy groups. Oxazoline waxes are available under designations including Oxawaxes TS-254, TS-254-A, TS-254AA and TS-970 from Commercial Solvents Corporation, Terre Haute, Indiana.

This illustrates a preferred species of hot melt suspending media wherein polarity is imparted to the waxes by the presence of one or more functional groups such as carboxyl, carbonyl, hydroxyl, ester, amide, amine, heterocyclic groups and combinations thereof. In addition to the oxazoline wax, others used successfully include those of the modified mineral type (synthetic waxes) or of vegetable origin. Specific synthetic waxes are Hoechst wax S, LP, and L, which are acid waxes based on montan wax, further modified by oxidation to obtain carboxylic acid groups in the final grades (some original ester groups are kept intact); Duroxon waxes J-324 AM, H 111, and E 421 R, which are oxygenated and esterified Fischer-Tropsch waxes; Paricin waxes which are glyceryl monohydroxy stearate, ethylene glycol monohydroxystearate, stearyl 12-hydroxystearate and N(2-hydroxyethyl)-12-hydroxystearamide. Further polar waxes incude Ceramid (hydroxyethylstearamide) from Glyco Chemicals, Inc.; Advawax (bisamide waxes) from Cincinnati Milacron; and Ceramer (a maleic anhydride-ethylene glycol-modified oxidized hydrocarbon wax) from the Bareco Division of the Petrolite Corporation.

All of these waxes can be used singly or in combination. Another bonus of most of the above mentioned polar waxes is their high melting point and their great hardness which eliminates wax transfer to the developing sheet, thus improving image clarity, increases blocking temperature and diminishes picking problems.

It should also be noted that the method of preparation of the dispersion in this example is one in which the hot melt phase is melted and stirred in molten form at reduced pressure while an aqueous slurry of microcapsules is added slowly and continuously. This technique results in an almost instantaneous removal of water. The upholding of nearly anhydrous conditions is important in this particular process because the microcapsules used have been found to degrade considerably in hot (about 70° C.) aqueous mixtures, but to be thermally stable at about 95° C. for about 18 hours under nearly anhydrous conditions.

Alternatively, the dispersion can be made by a process wherein HPC microcapsules in an aqueous slurry are spray dried to form a free flowing powder. This free flowing powder is stirred into a molten phase of a single wax or of a mixture of waxes to form a smooth dispersion of microcapsules in the continuous molten phase. The hot melt can be coated or printed onto the paper substrate. It sets immediately after application to the substrate and forms excellent marking sheets. Total coat weight of 3 to 4 pounds per 3300 square feet are used in the best examples of this method.

While this example establishes the use of HPC capsules in various polar hot melt suspending media as one preferred embodiment of a CB coating, applicants do not wish to be limited thereby. Other microcapsules may be used and a non-polar hot melt suspension medium may also be used as long as a dispersing agent is also present. The following examples are for the purpose of illustrating these additional preferred embodiments.

EXAMPLE II

In the following table (Table I) there are set forth some properties of spray dried microcapsules of various types alone and when dispersed in polar waxes and wax mixtures. In each case where waxes are used the capsule level is 40 parts by weight of the total mixture weight. HPC capsules are capsules with walls of hydroxypropylcellulose crosslinked with polyfunctional isocyanates and further crosslinked with melamine formaldehyde compounds. The regular HPC capsules have an oil to wall weight ratio of approximately 10:1; "thin-walled HPC capsules" have a ratio of about 15:1. I.S. capsules are made by the process of U.S. Pat. No. 3,796,669, The polyamide and HEC (hydroxyethylcellulose) capsules are made by the respective processes described in U.S. Pat. Nos. 3,016,308 and 3,429,827. The results are as set forth in Table I as follows:

TABLE I

| Capsule | Permeability by TGA*** Capsules at 90° C (mg/g/hr/loss) | Permeability by TGA, Capsules in Wax (mg/g/hr/loss) | Name of Wax | Chemical Type of Wax | Ring + Ball Softening Point | Viscosity Cps/ ° C | Penetration Hardness |
|---|---|---|---|---|---|---|---|
| Reg. HPC | 9.46 | 16.77 | Oxawax TS 254AA Hoechst Wax S | | 93° C | 1,213/98 | |
| Thin HPC | 16.06 | | 80:20 | | 93° C | 1,388/98 | |
| Gelatin | 2.12 | 15.02 | | | 90° C | 1,463/95 | |
| | 4.15 | 0.84 | " | | 94° C | 3,900/99 | |
| Polyamide* | 6.30 | 2.68 | " | | | 1,575/96 | |
| HEC** | 54.72 | 23.15 | " | | 91° C | 300/96 | |
| Reg. HPC | 9.46 | 15.0 | Oxawax TS 254AA | Polar wax with heterocycle. | 96° C | 800/101 | .3mm |
| Thin HPC | 16.06 | | " | Carries one or more OH groups, | 98° C | 925/98* | |
| Gelatin | 2.12 | 14.98 | " | a slightly basic wax | 95° C | 825/100 | |
| | 4.5 | | " | | 101° C | | |
| Polyamide* | 16.20 | | " | | 100° C | 2,550/106 | |
| HEC** | 54.72 | | " | | 101° C | 1,050/100 | |
| Reg. HPC | 9.46 | | Hoechst Wax S | Polar wax with Carboxyl, Keto, and ester groups, overall it is an acidic wax | 87° C | | less than 1mm hard and somewhat brittle |
| Thin HPC | 16.06 | | Hoechst Wax S | | 87° C | | |
| Gelatin | 2.17 | | " | | 83° C | | |
| | 4.15 | | " | | 88° C | 1,575/93 | |
| Polyamide* | 6.30 | | " | | | 775/91 | |
| HEC** | 54.72 | | " | | 86.5° C | | |

*Capsules decomposed, special precautions needed; should be run at 105° C.
**Fluid with lumps in hot melt formed; very discolored; dispersant needed.
***Thermogravimetric Analysis

EXAMPLE III

An aqueous slurry (40% solids) of regular HPC microcapsules (oil: wall ratio 10:1) containing 1% of Turkey Red Oil based on the total capsule weight was spray dried to form a free flowing powder. This powder was stirred into a molten, non-polar hydrocarbon microcrystalline wax, Be Square 170/175 (m.p. 170 - 175° F., Bareco Division of the Petrolite Corp., Tulsa, Oklahoma) to form a final mixture of 5% by weight of microcapsules in wax. The capsules dispersed very well, the hot melt was very fluid and of a light tan color. It was coated with a hot knife onto a 13.5 pound Impact Rawstock. On imaging againt a phenolic resin CF sheet a well-defined but faint image was obtained.

Other types of microcapsules or even HPC capsules without a dispersant were found not to disperse well in non-polar waxes or even some waxes of low polarity.

Accordingly, the preferred species of hot melt suspending media has been found to be polar materials as described in the previous examples.

EXAMPLE IV

In this example there is described the preparation and the behavior in non-polar hot melt waxes of several HPC microcapsule examples whose wall surfaces have been altered by depositing films of emulsifiers or dispersing agents onto them. The emulsifier or dispersing agent was mixed into the aqueous HPC microcapsule slurry in amounts of from about 1% to about 3% by weight of the total dry capsule weight. This slurry was spray dried to form a free-flowing powder of the modified microcapsules. It was then mixed with molten nonpllar hydrocarbon wax, e.g. Be Square 170/175 or Starwax 100 (Bareco Division of the Petrolite Corp.) to a level of 33% by weight microcapsules and 67% by weight wax. The finished hot melts were inspected visually for appearance, coated with a hot knife onto 13.5 pound Impact Rawstock and typed against phenolic resin coated developing sheets. The image thus produced was checked visually for image continuity and legibility. The results of this series of experiments were set forth in the following table (Table II).

transfer and a sharp developed image. In these examples prior art (aqueous emulsion coated) phenolic resin CF sheets were used for testing the CB sheets produced.

It is thus possible to utilize the hot melt CB coatings of Examples I-IV in the continuous production of manifold carbonless forms, especially ones in which the CB coatings are spot coated as a savings.

The only requirement is that a hot melt coating or printing operation (i.e., one in which the coating is maintained at above melting point of the coating) is followed by a cooling step to bind and solidify the resulting coating. As mentioned such a system is much less expensive and cumbersome, requires less floor space and requires less energy than systems which require expensive driers and/or solvent recovery systems.

While the method herein described constitutes a preferred embodiment of the invention, it is to be understood that the invention is not limited to this precise method, and that changes may be made therein without departing from the scope of the invention which is defined in the appended claims.

What is claimed is:

1. A liquid chromogenic coating composition comprising:

(a) a hot melt suspending medium, said hot melt suspending medium being water insoluble and having a melting point of from about 60° C. to about 140° C. and a melting point range of less than about 15°

TABLE II

| Trade Name of Emulsifier or Dispersant | Manufacturer | Class and Formula | Type | % Used* | Wax Used | Appearance of Dispersion | Appearance of Type Image |
|---|---|---|---|---|---|---|---|
| Tamol SN | Rohm & Haas Corp. | Sodium salt of condensed naphthalene sulfonic acid | Anionic | 3.0 | Be Square 170/175 | Smooth and creamy | Continuous, clear |
| Tamol 731 | Rohm & Haas Corp. | Sodium salt of polymeric carboxylic acid | Anionic | 3.0 | Be Square 170/175 | Smooth and creamy | Continuous, clear |
| Dextrol OC-35 | Dexter Chemical Corp. | Free acid of complex organic phosphate ester | Anionic | 3.0 | Be Square 170/175 | Smooth and creamy | Continuous, clear |
| Dodecyl Sodium Sulfate | J. T. Baker Chemical Co. | As in chemical name | Anionic | 3.0 | Starwax 100 | Smooth, creamy | Continuous, clear, best of all. |
| Turkey Red Oil | Generally commercially available | Sulfated castor oil | Anionic | 1.0 | Be Square 170/175 | Smooth, creamy | Continuous, clear |
| Gantrez 903 | General Aniline & Film Corporation | Poly(methylvinyl ether/maleic anhydride) | Anionic | 3.0 | Starwax 100 | Not completely smooth. A little too viscous | Not quite as good as the above, but passable. |
| Varisoft 475 | Varney Chemical Div. | Methyl (1) alkylamidoethyl (2) alkyl imidazolinium methosulfate | Cationic | 3.0 | Starwax 100 | Poor, somewhat better than with inmodified HPC capsules | Broken, not too clear |
| Arosurf TA-100 | Ashland Chemical Co. | Dimethyldistearyl ammonium chloride | Cationic | 3.0 | Starwax 100 | Poor | Poor |
| Cetyltrimethyl ammonium bromide | Aldrich Chemical Corp. | As under Tradename | Cationic | 3.0 | Starwax 100 | Poor | Faint good image produced probably from a fraction of dispersed capsules. (Might work on higher level.) |
| Barquat CME-A | Baird Chemical Industries, Inc. | N,N-Cetyl ethyl morpholinium ethosulfate | Cationic | 3.0 | Starwax 100 | Very Poor | Very Poor. |
| Triton N-100 | Rohm & Haas Corp. | Nonylphenoxy polyethoxy ethanol | Nonionic | 3.0 | Starwax 100 | Very viscous, lumpy | Not coated and typed. |
| Triton X-165 | Rohm & Haas Corp. | Octylphenoxy polyethoxy ethanol | Nonionic | 3.0 | Starwax 100 | Very viscous, grainy | Poor. |
| Polyethylene Glycol 400 Monolaurate | Glyco Chemicals Co., Inc. | As in Tradename | Nonionic | 3.0 | Starwax 100 | Poor, very viscous | Very Poor. |
| Polyethylene Glycol 400 Monolaurate plus Arlacel C | Atlas Chemical Ind. | Sorbitan Sesquioleate | Nonionic | 1.5 } 3.0<br>1.5 | Starwax 100 | Viscous, lumpy | Poor |

*Based on total (dry) microcapsule weight.

From Examples I-IV it can be seen that various CB coatings of the hot melt type can effectively be prepared, coated in fluid hot melt form, set by cooling, and joined with a CF sheet to produce a carbonless copy sheet which upon application of pressure gives good C., said hot melt suspending medium being characterized by the presence of one or more functional groups selected from the group consisting of: carboxyl, carbonyl, hydroxyl, ester, amide, amine, heterocyclic groups and combinations thereof, said hot melt suspending medium being further characterized by having a weight loss rating of less than about 15 mg/g/hr. at 90° C. on a thermogravimetric scale when a 20.0 mg. sample of said hot melt suspending medium is analyzed and a heat resistance characteristic as measured by typewriter intensity decline on a seven day period of less than about 15 units loss when initial typewriter intensity is less than about 75 typewriter intensity units to impart polarity thereto; and (b) a microencapsulated chromogenic material, said chromogenic material being a color precursor of the electron donating type said chromogenic material being mixed with a carrier oil to form an oil solution of said chromogenic color precursor material, said oil solution being microencapsulated by combination with one or more wall forming compounds.

2. The coating composition of claim 1 wherein said color precursor is selected from the group consisting of: lactone phthalides, lactone fluorans, lactone xanthenes, leucoauramines 2-(omega substituted vinylene) 3,3-disubstituted-3-H-indoles, 1,3,3-trialkylindolindospirans and mixtures thereof.

3. The coating composition of claim 1 further including a dispersing agent for said microencapsulated chromogenic material.

4. The coating composition of claim 3 wherein said dispersing agent is an anionic dispersing agent selected from the group consisting of: the sodium salts of condensed naphthalene sulfonic acids, the sodium salts of polymeric carboxylic acids, the free acids of complex organic phosphate esters, sulfated castor oil, poly (methyl vinyl ether/maleic anhydride) and mixtures thereof.

5. The coating composition of claim 4 wherein said dispersing agent is present in an amount of from about 0.1% to about 10.0% based on the dry microcapsules weight.

6. The coating composition of claim 1 wherein said one or more wall forming compounds are selected from the group consisting of: hydroxypropylcellulose, carboxymethylcellulose, gelatin, methylcellulose, melamine-formaldehyde, polyfunctional isocyanates and prepolymers thereof, polyfunctional acid chlorides, polyamines, polyols, epoxides and mixtures thereof.

7. A liquid chromogenic coating composition comprising:

(a) a hot melt suspending medium, said hot melt suspending medium being characterized by:

(i) being substantially water insoluble, (ii) being characterized by the presence of one or more functional groups selected from the group consisting of: carboxyl, carbonyl, hydroxyl, ester, amide, amine, heterocyclic groups and combinations thereof to impart polarity thereto, (iii) having a melting point of from about 60° C. to about 140° C. and a melting range of from about 0° C. to about 15° C., (iv) a weight loss rating of less than about 15 mg/g/hr. at 90° C. on a thermogravimetric scale when a 20.0 mg. sample of said hot melt suspending medium is analyzed, and (v) a heat resistance characteristic as measured by typewriter intensity decline over a seven day period of less than about 15 units loss when initial typewriter intensity is less than about 75 typewriter intensity units;

(b) a dispersing agent present in an amount of from about 0.1% to about 10.0% based on the dry microcapsule weight, said dispersing agent being an anionic dispersing agent selected from the group consisting of: the sodium salts of condensed naphthalene sulfonic acids, the sodium salts of polymeric carboxylic acids, the free acids of complex organic phosphate esters, sulfated castor oil, poly (methyl vinyl ether/maleic anhydride) and mixtures thereof; and (c) a microencapsulated chromogenic material, said chromogenic material being a color precursor of the electron donating type said chromogenic material being mixed with a carrier oil to form an oil solution of said chromogenic color precursor material, said oil solution being microencapsulated by combination with one or more wall forming compounds selected from the group consisting of: hydroxypropylcellulose, methylcellulose, carboxymethylcellulose, gelatin, melamine-formaldehyde, polyfunctional isocyanates and prepolymers, polyfunctional acid chlorides, polyamides, polyols, expoxides and mixtures thereof.

8. The coating composition of claim 7 wherein said chromogenic material is microencapsulated by the formation of a microcapsule wall which is the reaction product of a polyfunctional isocyanate cross-linking agent and a hydroxypropylcellulose wall forming compound.

* * * * *